(12) United States Patent
Fukuda et al.

(10) Patent No.: US 9,405,497 B2
(45) Date of Patent: Aug. 2, 2016

(54) CUSTOM PAPER INFORMATION CONVERTER

(75) Inventors: Shin Fukuda, Port Washington, NY (US); Yoshikazu Takahashi, Tokyo (JP)

(73) Assignee: Canon U.S.A. Inc., Melville, NY (US)

( * ) Notice: Subject to any disclaimer, the term of this patent is extended or adjusted under 35 U.S.C. 154(b) by 990 days.

(21) Appl. No.: 12/771,716

(22) Filed: Apr. 30, 2010

(65) Prior Publication Data

US 2011/0109933 A1 May 12, 2011

Related U.S. Application Data

(60) Provisional application No. 61/178,739, filed on May 15, 2009.

(51) Int. Cl.
*G06F 3/12* (2006.01)

(52) U.S. Cl.
CPC ............ *G06F 3/1285* (2013.01); *G06F 3/1203* (2013.01); *G06F 3/1227* (2013.01)

(58) Field of Classification Search
CPC .................................................... G06F 3/1298
See application file for complete search history.

(56) References Cited

U.S. PATENT DOCUMENTS

| | | | |
|---|---|---|---|
| 6,079,807 A * | 6/2000 | Lindstrom et al. | 347/16 |
| 6,993,724 B2 | 1/2006 | Minagawa | |
| 2002/0063877 A1* | 5/2002 | Lucivero et al. | 358/1.13 |
| 2004/0109196 A1* | 6/2004 | Nakao et al. | 358/1.15 |
| 2005/0105129 A1* | 5/2005 | Takahashi | 358/1.15 |
| 2005/0248791 A1* | 11/2005 | Ganji | 358/1.12 |
| 2006/0176499 A1 | 8/2006 | Shintoku | |
| 2007/0279673 A1* | 12/2007 | Utsunomiya | 358/1.14 |
| 2010/0225957 A1* | 9/2010 | Liu | 358/1.15 |

* cited by examiner

*Primary Examiner* — John Wallace
(74) *Attorney, Agent, or Firm* — Canon U.S.A. Inc., IP Division

(57) ABSTRACT

A method for generating custom postscript printer description files, the method including obtaining paper type information, obtaining an original postscript printer description file, converting the paper type information into a postscript printer description format, inserting the converted paper type information into the original postscript printer description file to create a custom postscript printer description file, and storing the custom postscript printer definition file.

18 Claims, 16 Drawing Sheets

1. Extracts custom paper name and ID from Custom paper type file.

Below is the XML hierarchy.
   - Name : <mediaParameter> -> <basic> -> <name>
   - ID   : <mediaParameter> -> <basic> -> <id>

2. Convert paper name and ID to PPD format.

Below is the PPD format.

\*Media Type [OptionKeyword]/[TranslationString]: "<</Media Type <ffff[paper ID]>
   /Policies <</MediaType 1>> >> systemdict /setpagedevice get exec"
   \*End

[OptionKeyword] will be replaced by "CUSTOM" following an incremental number. (For example, CUSTOM1, CUSTOM2, CUSTOM3,...).

[TranslationString] will be replaced by the name extracted form Custom paper type file. If the name has semi-colon (:), semi-colon will be replaced by space character. Because semi-colon is used as delimiter in PPD format.

[paper ID] is 8 digits number in hexadecimal format, and the value is the id extracted from Custom paper type file.

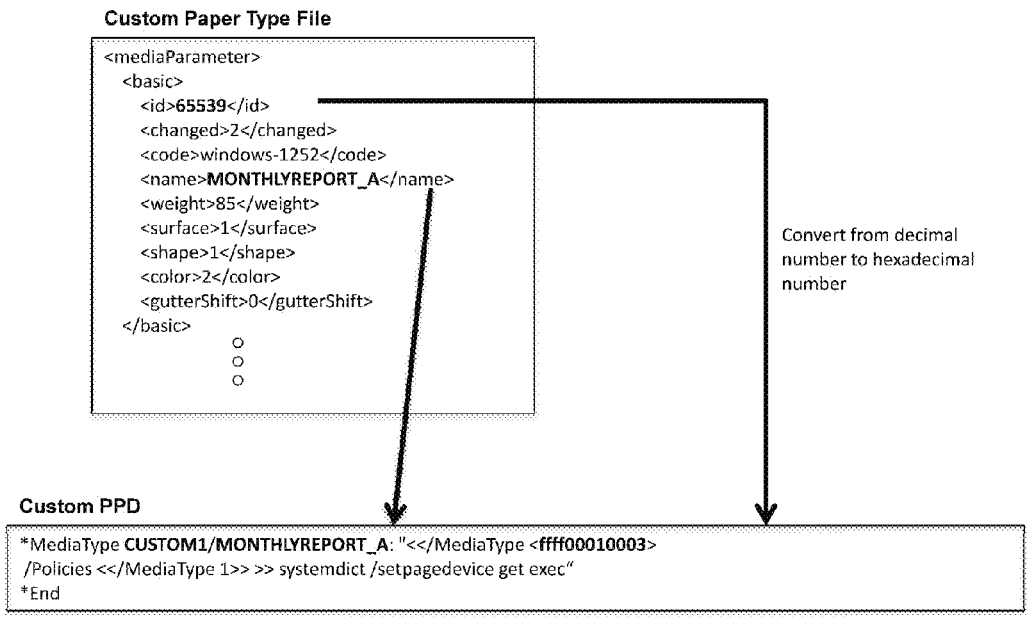

CUSTOM PAPER INFORMATION CONVERTER

CROSS-REFERENCE TO RELATED APPLICATION

This application claims the benefit of U.S. Provisional Application No. 61/178,739, filed May 15, 2009, which is hereby incorporated by reference in its entirety.

BACKGROUND OF THE INVENTION

1. Field of the Invention

The invention relates to printing using PostScript Printer Description (PPD) files using custom paper types.

2. Description of the Related Art

Current printing devices, such as multifunction purpose (MFP) devices, have paper type management features that allow users of the MFP to register custom paper types not already registered in the printing device. Being able to register custom paper types provides users with the ability to print documents using the registered paper types via the printing device's printer driver.

One drawback to the current implementation however, is that a user does not have the ability to print a document using a registered custom paper type with an application that uses a PostScript Printer Description (hereinafter "PPD") file instead of the printing device's printer driver. This is because the PPD file does not contain information on the registered custom paper types.

In light of the above, what is needed is a way to provide users the ability to print documents using registered custom paper types with an application that uses PPD files.

SUMMARY OF THE INVENTION

To solve the aforementioned issue, the present invention provides for printing via an application that uses PPD files using registered custom paper types.

According to an aspect of the present invention.

Further aspects and features of the present invention will become apparent from the following description of exemplary embodiments (with reference to the attached drawings).

BRIEF DESCRIPTION OF THE DRAWINGS

FIGS. 11A-11B illustrate an exemplary process of converting a file to PPD format according to an exemplary embodiment.

DETAILED DESCRIPTION OF EXEMPLARY EMBODIMENTS

Figure 1:
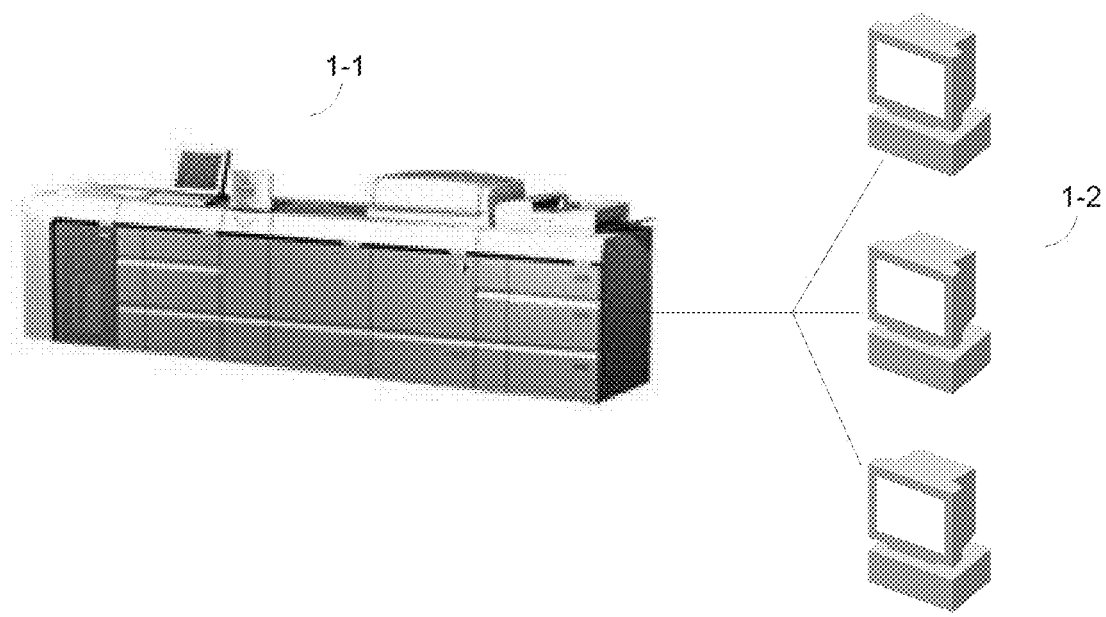
FIG. 1 is a representational view illustrating a system of an exemplary embodiment.

FIG. 1 is a representational view illustrating a system of an exemplary embodiment. More specifically, the system includes a multi-function device 1-1 connected to host computers 1-2. The multi-function device 1-1 can be connected to host computers 1-2 via any type of interface that would enable communication between the devices. For example, a Local Area Network (LAN), Wide Area Network (WAN), where these networks could be wired, wireless, or a combination of both.

Figure 2:
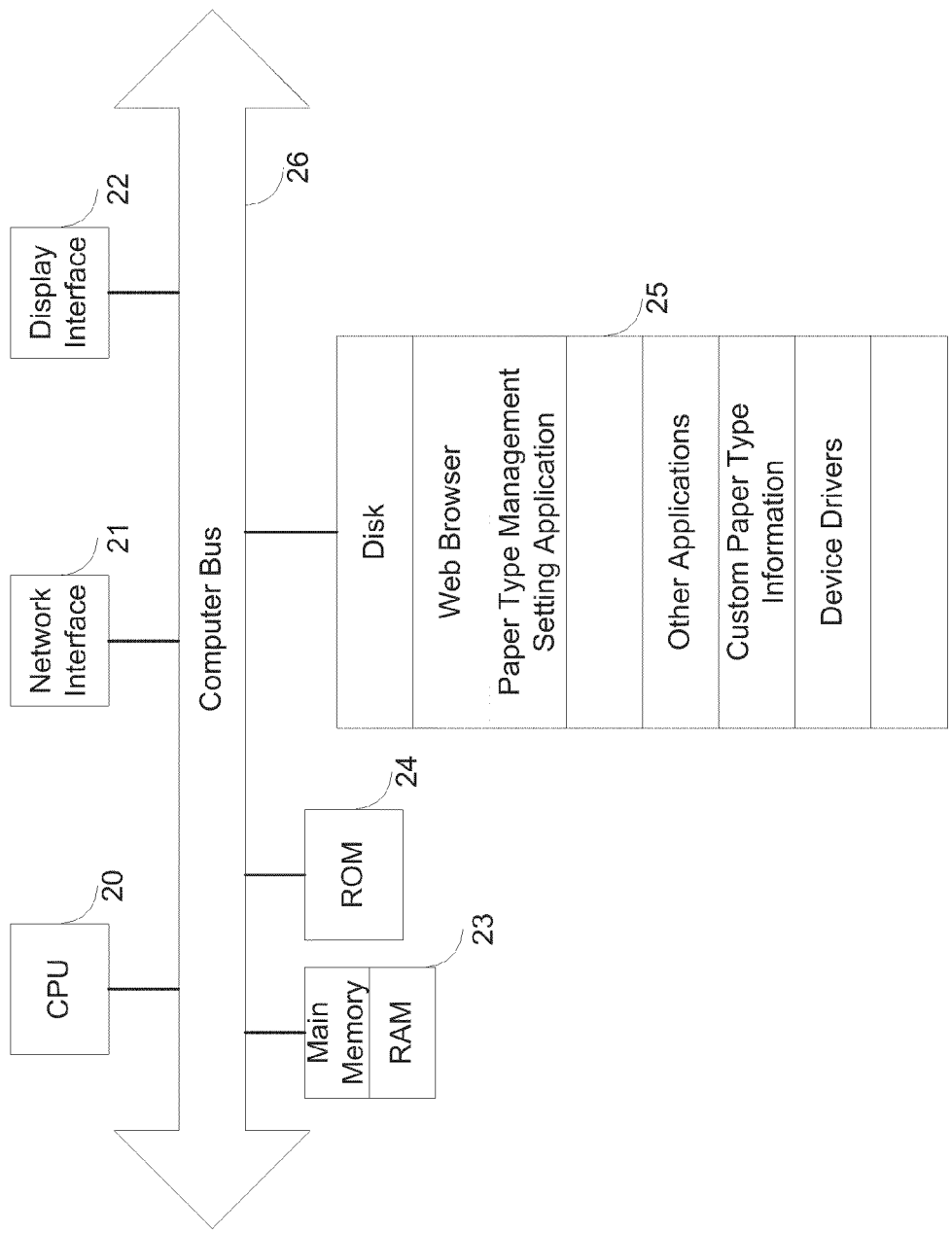
FIG. 2 is a block diagram illustrating the internal architecture of a multi-function machine.

FIG. 2 is a block diagram of an example of the internal architecture of multi-function device 1-1. Shown in FIG. 2 is CPU 20, network interface 21 to enable communications between multi-function device 1-1 and other device, and display interface 22 for interfacing with an LCD display (not shown).

Read only memory (ROM) 24 stores invariant computer-executable process steps for basic system functions such as basic I/O, start-up, etc. Main random access memory (RAM) 23 provides CPU 20 with memory storage that can be accessed quickly. In this regard, computer-executable process steps of a paper type management setting application, as well as other applications, are transferred from disk 25 over computer bus 26 to RAM 23 and executed therefrom by CPU 20.

Disk 25, which, in addition to the paper type management setting application, includes an operating system, a web browser executable on the particular operating system, and other applications that enable the multi-function device 1-1 to provide a multitude of different functions. Disk 25 further includes custom paper type information and device drivers. All of the above described components of multi-function device 1-1 are connected to each other via computer bus 26.

Figure 3:
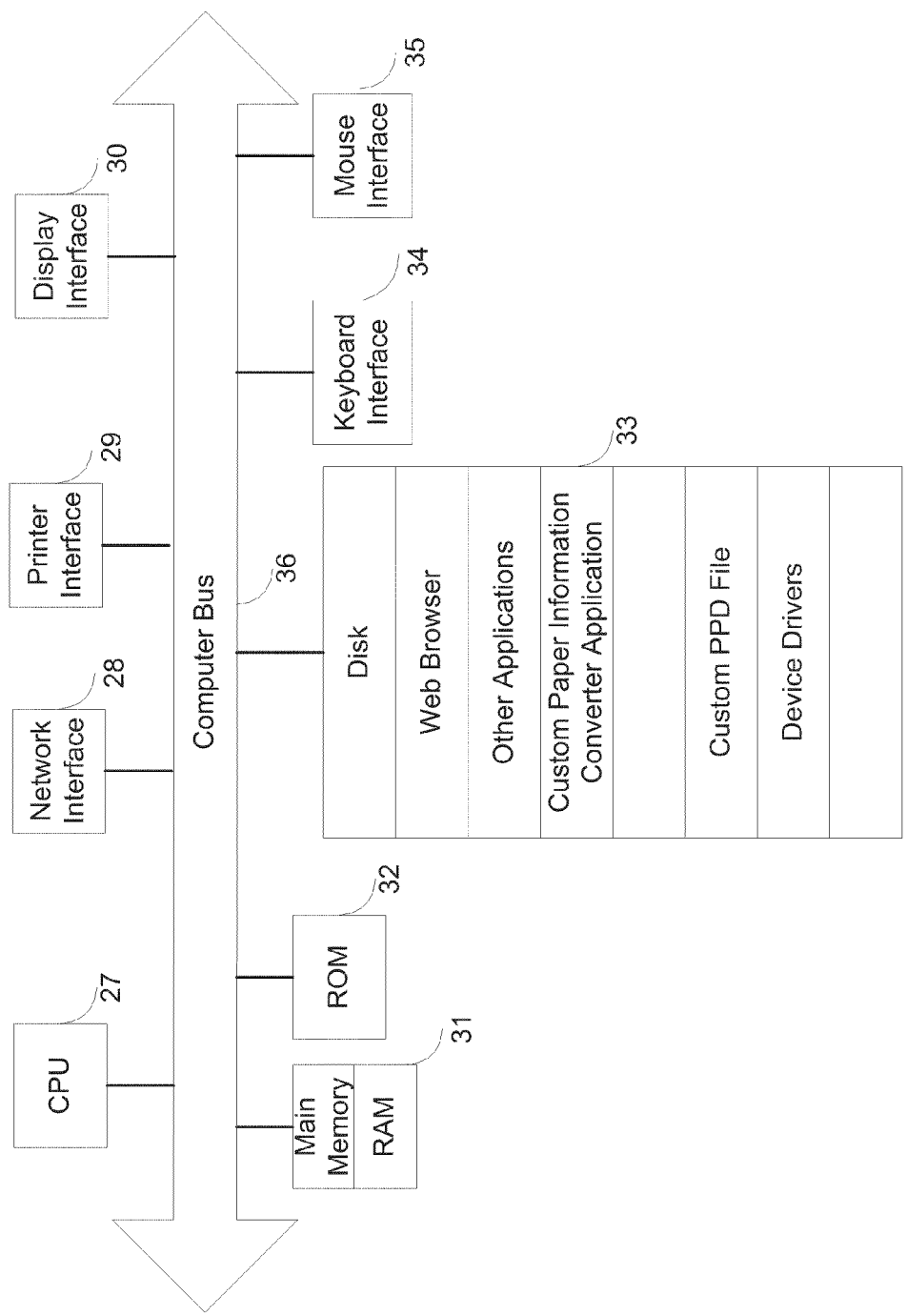
FIG. 3 is a block diagram illustrating the internal architecture of a computer utilizing a custom PPD file.

FIG. 3 is a block diagram of an example of the internal architecture of one of the host computers 1-2. Shown in FIG. 3 is CPU 27, which interfaces with to computer bus 36. Also interfacing with computer bus 36 are network interface 28, which enables host computer 1-2 to communicate with other devices across a network, printer interface 29, which enables host computer 1-2 to communicate with a local printer (not shown), display interface 30, for interfacing with an LCD display (not shown), keyboard interface 34 for interfacing with a keyboard (not shown), and mouse interface 35 for interfacing with a mouse (not shown).

Read only memory (ROM) 31 stores invariant computer-executable process steps for basic system functions such as basic I/O, start-up, etc. Main random access memory (RAM) 32 provides CPU 27 with memory storage that can be accessed quickly. In this regard, computer-executable process steps of a custom paper information converter application, as well as other applications, are transferred from disk 33 over computer bus 36 to RAM 31 and executed therefrom by CPU 27.

Disk 33, which, in addition to the custom paper information converter application, includes an operating system, a web browser executable on the particular operating system, and other applications that enable host computer 1-2 to provide a multitude of different functions. Disk 33 further includes a custom PPD file and device drivers. All of the above described components of host computer 1-2 are connected to each other via computer bus 36.

Figure 4:
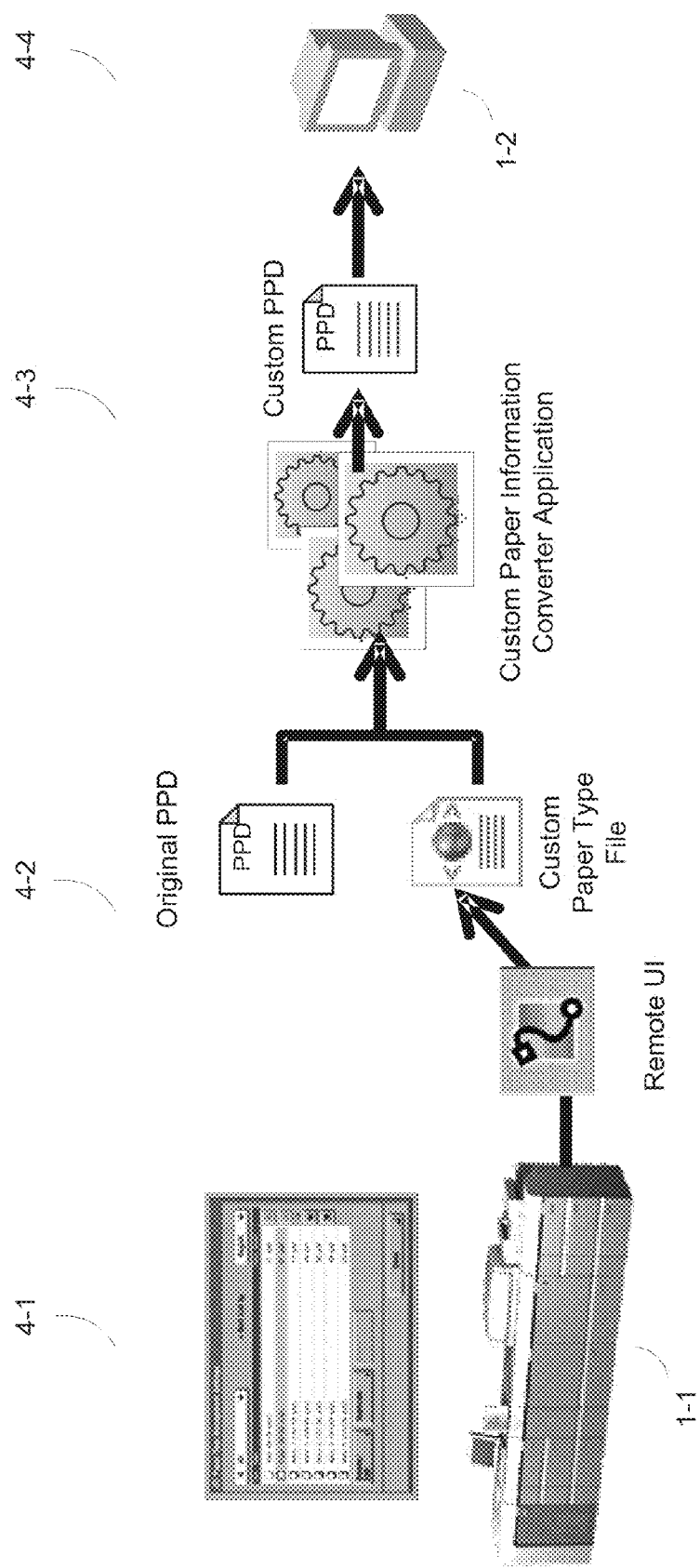
FIG. 4 is a representational view illustrating a process of an exemplary embodiment.

FIG. 4 is a representational view illustrating a process of the present exemplary embodiment. More specifically, the process includes registering custom paper type information onto a printing device, exporting the custom paper type information from the printing device, using the custom paper type information to generate a custom PPD file, and installing the custom PPD file for use by a user.

Turning to FIG. 4, in 4-1, custom paper type information is registered onto multi-function device 1-1. The custom paper type information can be registered either directly at the multi-function device 1-1 via the multi-function device's 1-1 integrated display or remotely. In the case where two or more multi-function devices are present, a custom paper type setting from one device can be copied or imported to another device. This enables a user to avoid having to register custom paper type information in each and every device the user wants the information on.

Next, in 4-2, the registered custom paper type information is exported from multi-function device 1-1. In the exemplary embodiment illustrated in FIG. 4, a remote user interface (UI) is used to facilitate exporting the customer paper type information. However, any method for facilitating the export process, such as from a UI located on the multi-function device 1-1, that would enable practice of the present invention is applicable.

When exported, the custom paper type information is saved as a custom paper type file. In an exemplary embodiment, the file is saved as an Extensible Markup Language (XML) file. However, any file format that would enable practice of the present invention is applicable. In the present exemplary embodiment, the custom paper type file is stored on host computer 1-2, but can be stored in any storage location, e.g., standalone data storage server, that would enable practice of the present invention.

FIGS. 9A-9E illustrate exemplary user interfaces (UI) for exporting custom paper type information according to the present embodiment. The exemplary user interface may vary depending on the particular device from which the custom paper information is being exported. Any user interface that would enable practice of the present invention is applicable.

Figure 9A:
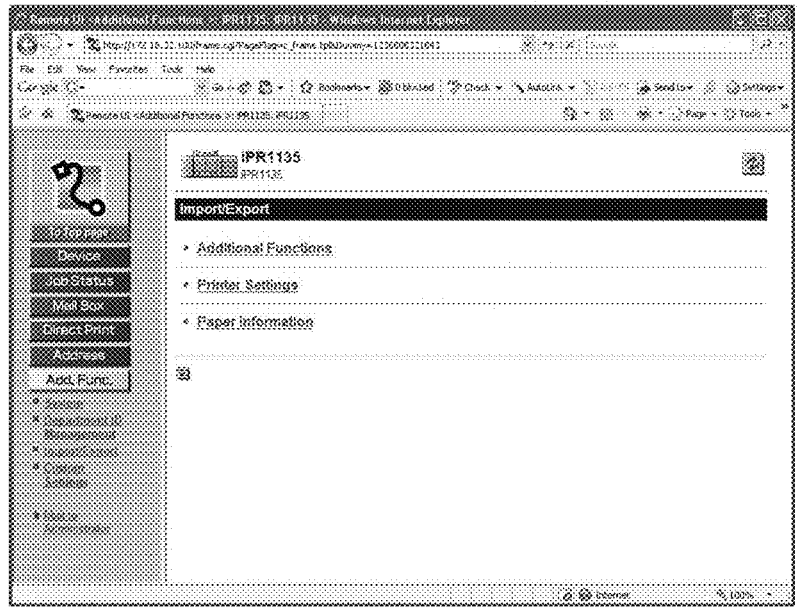
FIGS. 9A-9E illustrate exemplary user interfaces for exporting custom paper type information according to an exemplary embodiment.

FIG. 9A illustrates a UI associated with the printing device (multi-function device 1-1) that can be opened via web browser. As illustrated, the "Add Func"/"Import/Export"/"Paper Information" feature is selected to initiate the process depicted in FIG. 4.

Figure 9B:
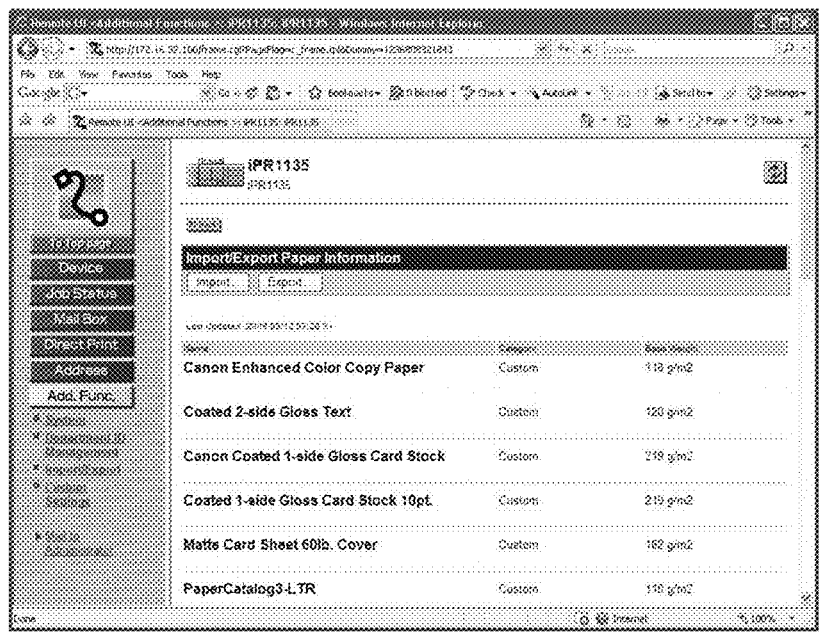
Figure 9C:
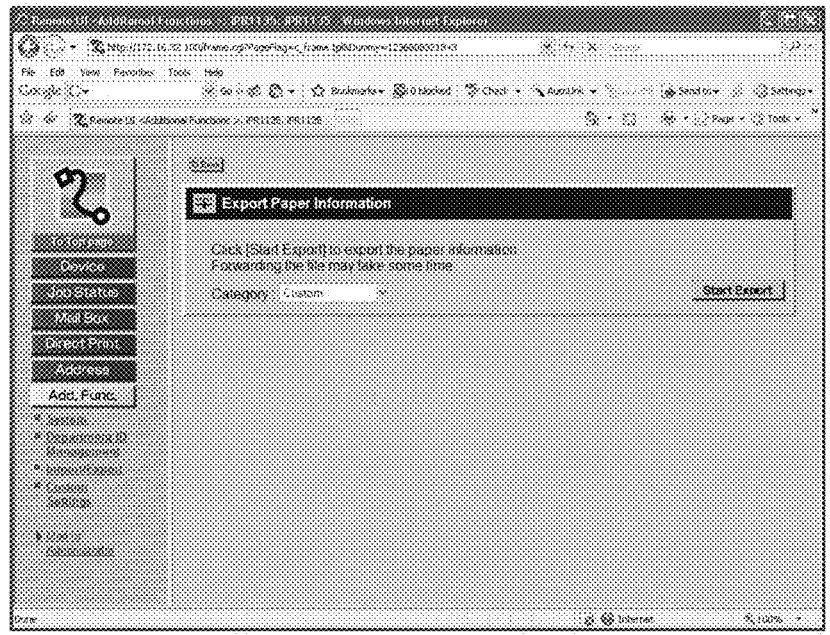
Figure 9D:
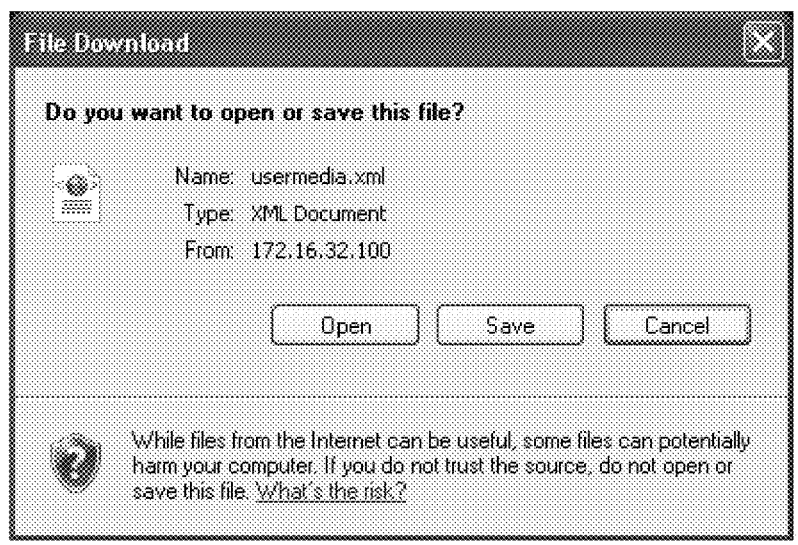
Figure 9E:
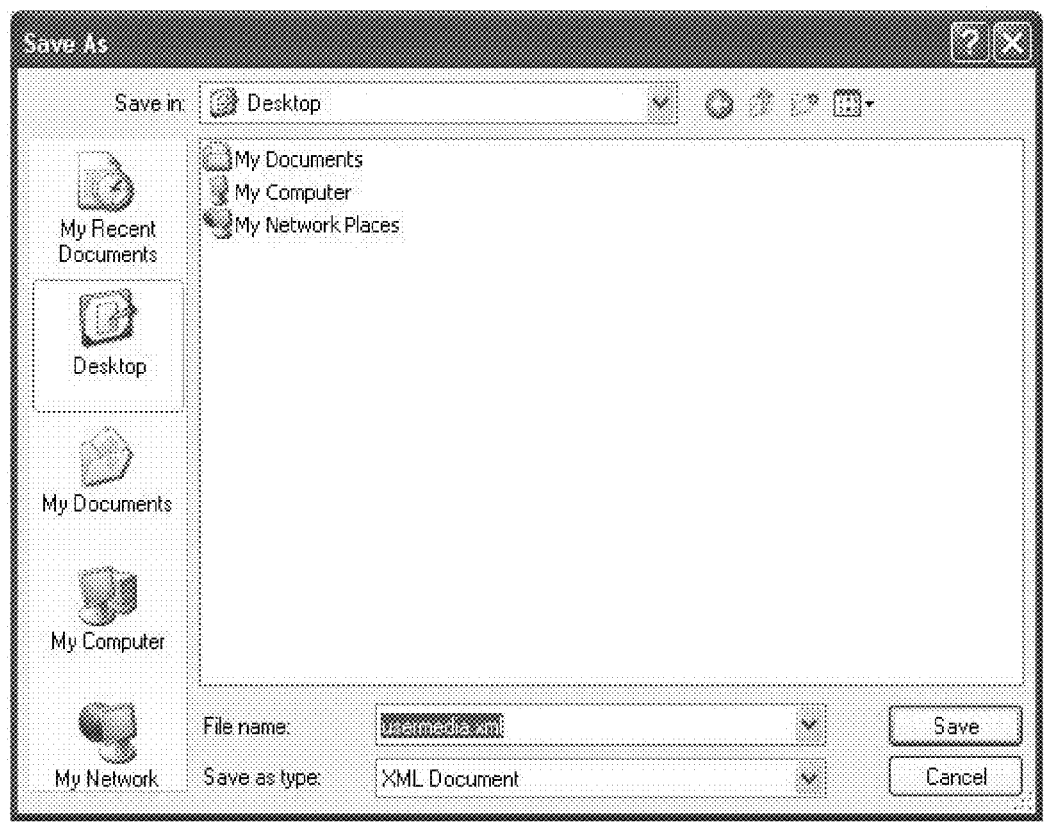

As illustrated in FIG. 9B, an "Export" tab is selected. Then, in FIG. 9C, the "Custom" option is selected from a dropdown list and the "Start Export" button is selected to initiate the export process. In FIG. 9D, the "Save" button is selected to save/store the exported custom paper type file. In FIG. 9E, a file name and storage location/file path are assigned and the "Save" button is selected to save the file.

In another embodiment, in order to avoid having to register the custom paper type registered on multi-function device 1-1, the stored custom paper type file can be imported onto the other device. Any known method for importing a file onto a device that would enable practice of the present invention is applicable.

Turning back to FIG. 4, in 4-2, the custom paper information converter application is used to generate a custom PPD file. More specifically, the custom paper information converter application uses an original PPD file and the custom paper type file to generate the custom PPD file. The custom paper type information is converted from XML format into PPD format, inserted into the original PPD file, and the resulting file is stored as a custom PPD file. A detailed description of generating the custom PPD file is provided below with respect to FIG. 5.

Following generation of the custom PPD file in 4-3, in 4-4, the custom PPD file is then used with an application that a user of host computer 1-2 wishes to print with. The manner in which the custom PPD file is used is the same as the currently known method for using a standard PPD file, and thus, a detailed description is omitted herein.

Figure 5:
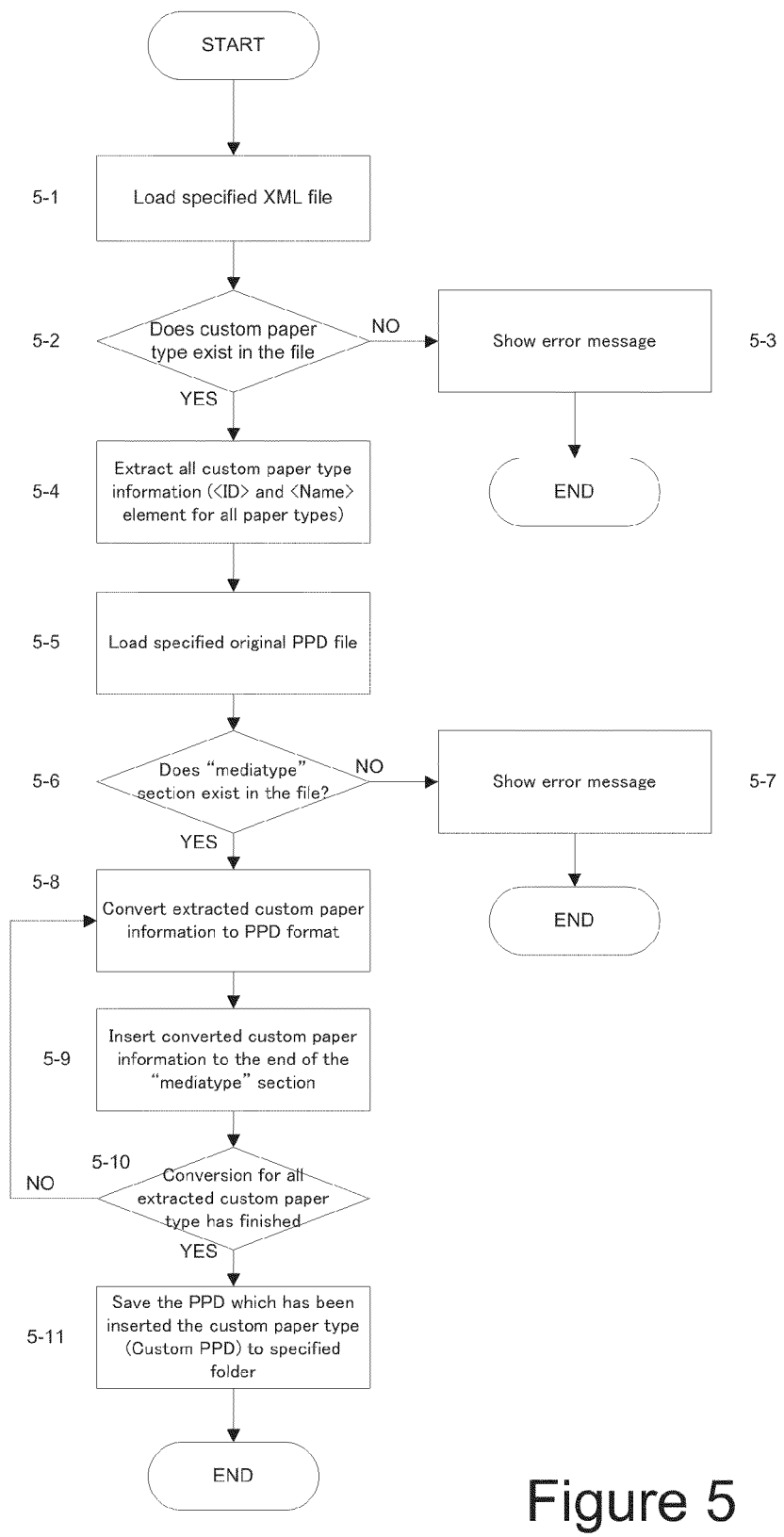
FIG. 5 is a flowchart for generating a custom PPD file according to an exemplary embodiment.

FIG. 5 is a flowchart for generating a custom PPD file according to an exemplary embodiment. First, in step 5-1, a specified XML file is loaded. In step 5-2, a check is made to determine whether the loaded XML file contains custom paper type information. If the file does not contain any custom paper type information, flow proceeds to 5-3, where an error message is displayed and then the process terminates.

If it is determined that the file does contain custom paper type information, then flow proceeds to step 5-4. In step 5-4, all of the custom paper type information is extracted from the file. Then, in step 5-5, an original PPD file is selected and loaded. Next, in step 5-6, a determination is made whether a "MediaType" section exists in the PPD file. The "MediaType" section of a PPD file is where paper type information is stored. If no "MediaType" section exists, then the flow proceeds to step 5-7 where an error message is displayed, and then the process terminates.

Figure 11B:
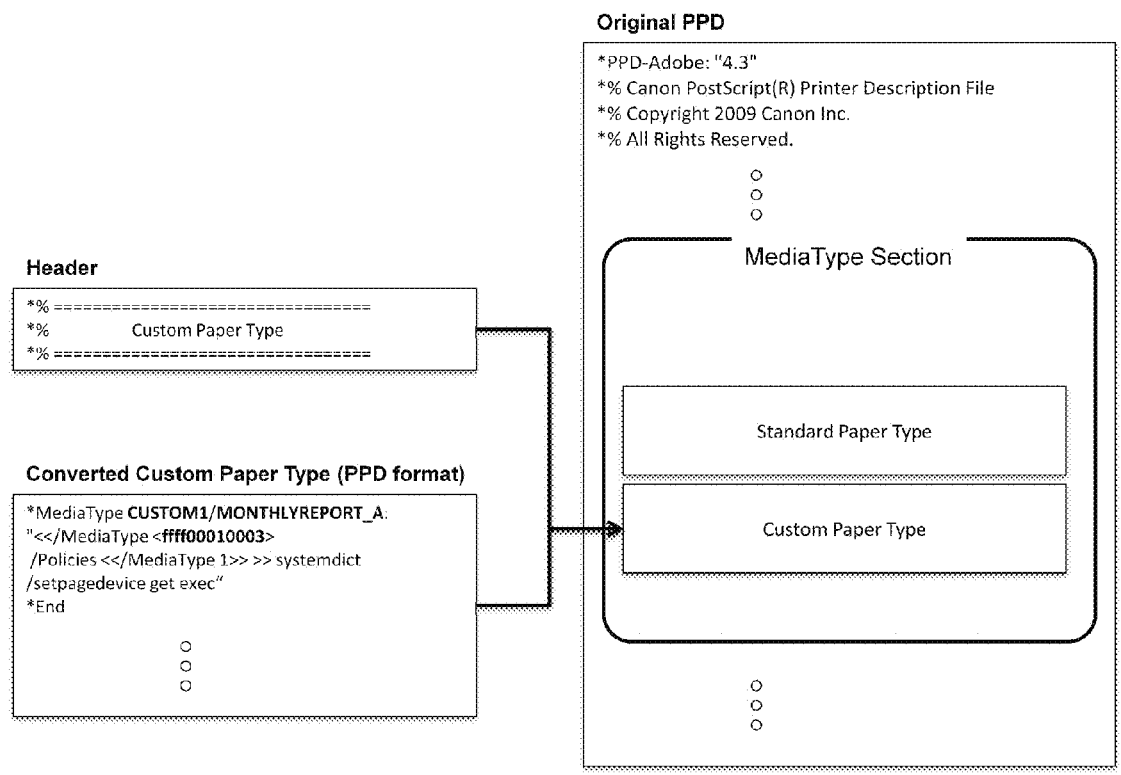

If it is determined that a "MediaType" section exits in the file, flow proceeds to step 5-8. In step 5-8, the custom paper type information extracted in step 5-4 is converted to PPD format. FIGS. 11A-11B illustrate an exemplary process of converting a file to PPD format according to the present embodiment Turning to FIGS. 11A-11B, in step 1, custom paper name and ID are extracted from the custom paper type file. Next, in step 2, the custom paper name and ID are converted to PPD format. Next, in step 3, the converted PPD is inserted into the original PPD file. The converted custom paper type is inserted into the original PPD with a header, and then the modified original PPD file is saved as a custom PPD. The position where custom paper type is inserted is at the end of the "MediaType" section of the original PPD.

Next, in step 5-9, the converted custom paper information is added to the end of the "MediaType" section of the original PPD file. Then, in step 5-10, a check is made whether all of the extracted custom paper type information has been converted. If there is still some information left to be converted, flow proceeds back to step 5-8. If there is no more information to be converted, flow proceeds to step 5-11.

In step 5-11, the PPD file to which the converted custom paper type information has been added is stored. In an exemplary embodiment, the PPD file is stored on host computer 1-2. However, any storage location, e.g., remote data storage server that would enable practice of the present invention is applicable. Then, the process ends.

FIGS. 10A-10E illustrate exemplary user interfaces associated with creation of a custom PPD file as described above. The present embodiment is not limited to what is illustrated in FIGS. 10A-10E, and any method used to create a PPD file that would enable practice of the present invention is applicable.

Figure 10A:
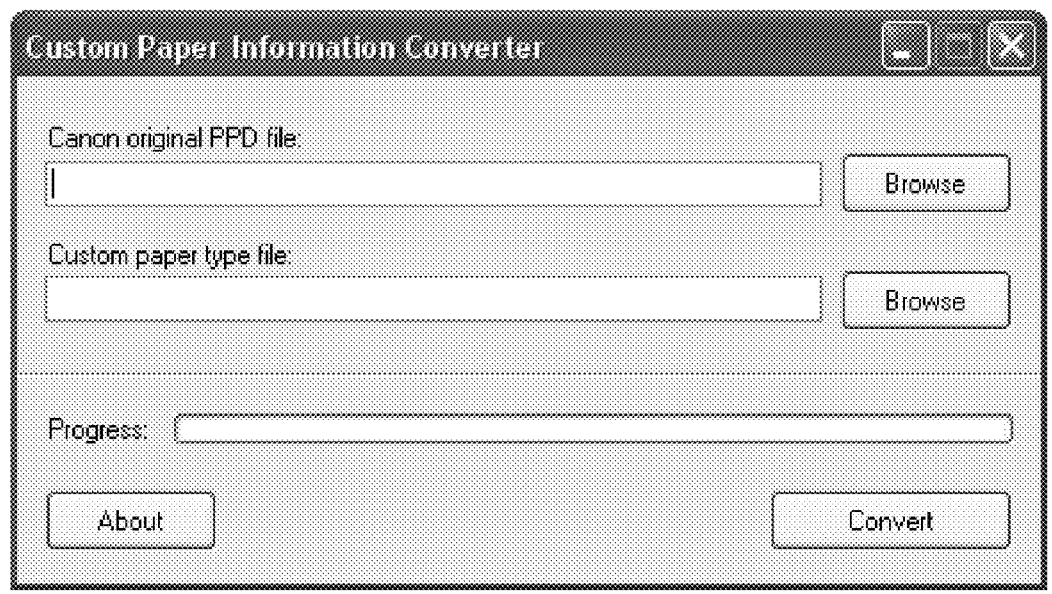
FIGS. 10A-10E illustrate exemplary user interfaces associated with creation of a custom PPD file according to an exemplary embodiment.

FIG. 10A illustrates an exemplary user interface used to initiate creation of a custom PPD file. As illustrated, an original PPD file is specified along with a custom paper type file. The custom paper type file is typically the file that was previously exported as described above.

Figure 10B:
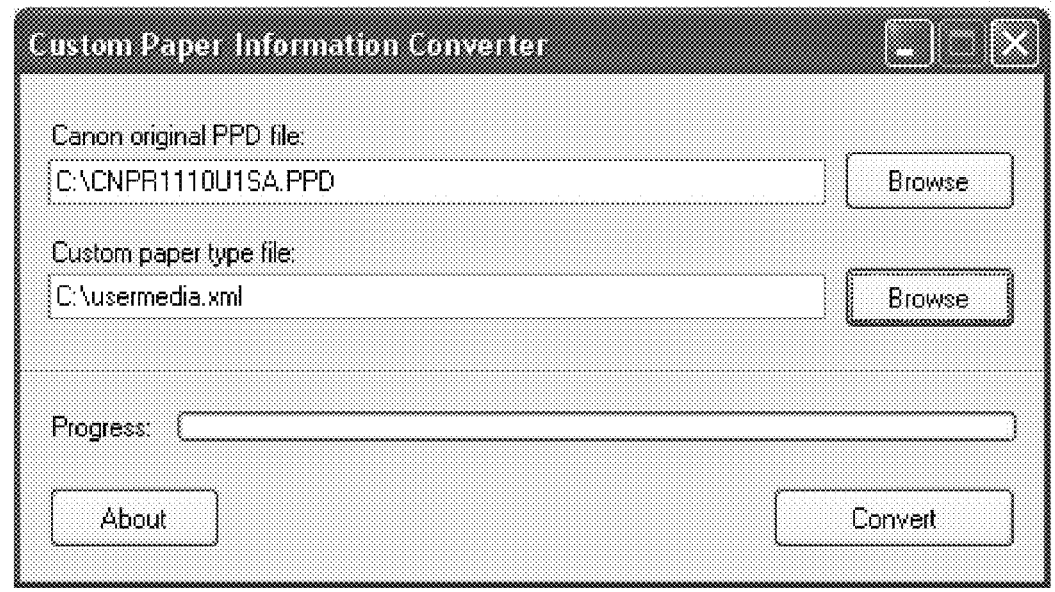

FIG. 10B illustrates selection of exemplary original PPD and custom paper type files. After these files have been selected, the conversion process is initiated by selecting the "Convert" button.

Figure 10C:
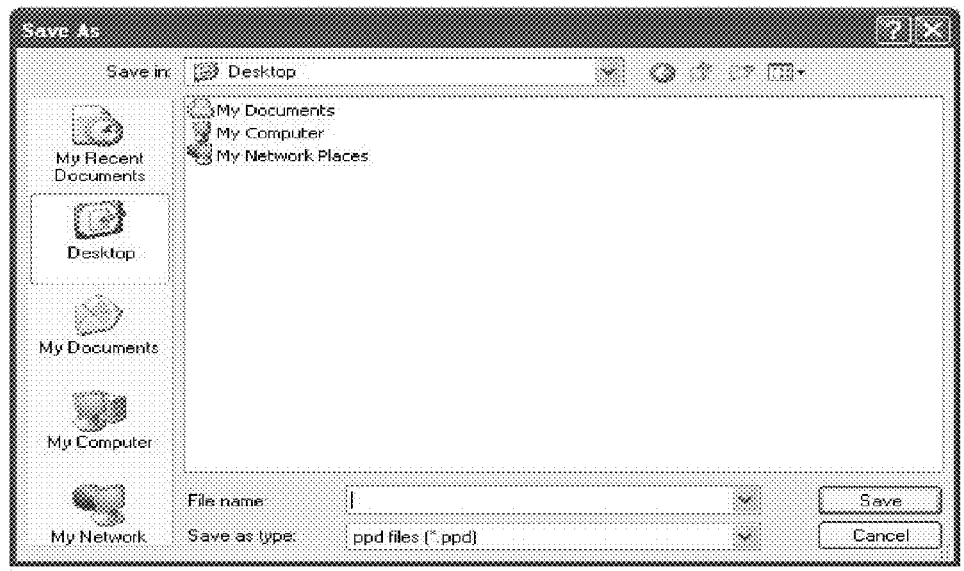

After selection of the "Convert" button, the user interface in FIG. 10C prompts a user to select a file name for the custom PPD file and the location where the file is to be stored/saved. After the file name and storage location have been specified, the "Save" button is selected. If the specified file already exists, the user is prompted whether to replace the existing file.

Figure 10D:
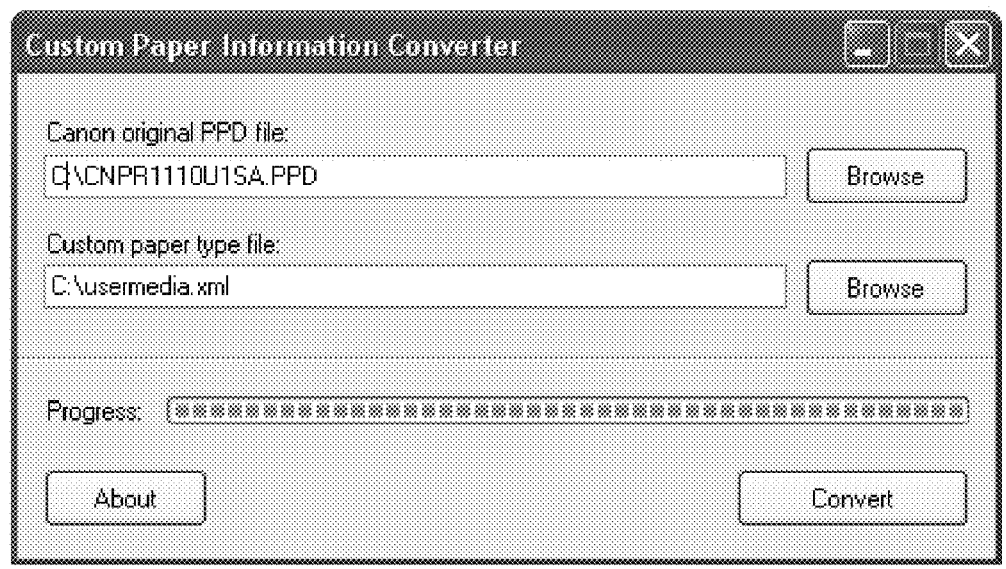
Figure 10E:

Following selection of the "Save" button, the conversion process begins. During the conversion, the progress of the conversion is provided as illustrated in FIG. 10D. When the conversion is completed, a dialog box as illustrated in FIG. 10E is displayed. Selection of the "OK" button results in returning to the user interface in FIG. 10A. The resulting generated custom PPD file can be found at the storage location as designated above. In the present embodiment, the above-described process can be terminated at any point by selecting the close button located in the top right-hand corner of any of the above-described user interfaces.

In a different embodiment of the present invention, every time a user changes the registration of the paper type, the user executes the above-mentioned process again to use the paper type that the user just changed. Changing the registration of the paper type includes, but is not limited to, registering additional paper types with the printing device (multi-function device 1-1), modifying the information of the existing paper type, deleting the existing paper type from the printing device (multi-function device 1-1), etc.

Figure 6:
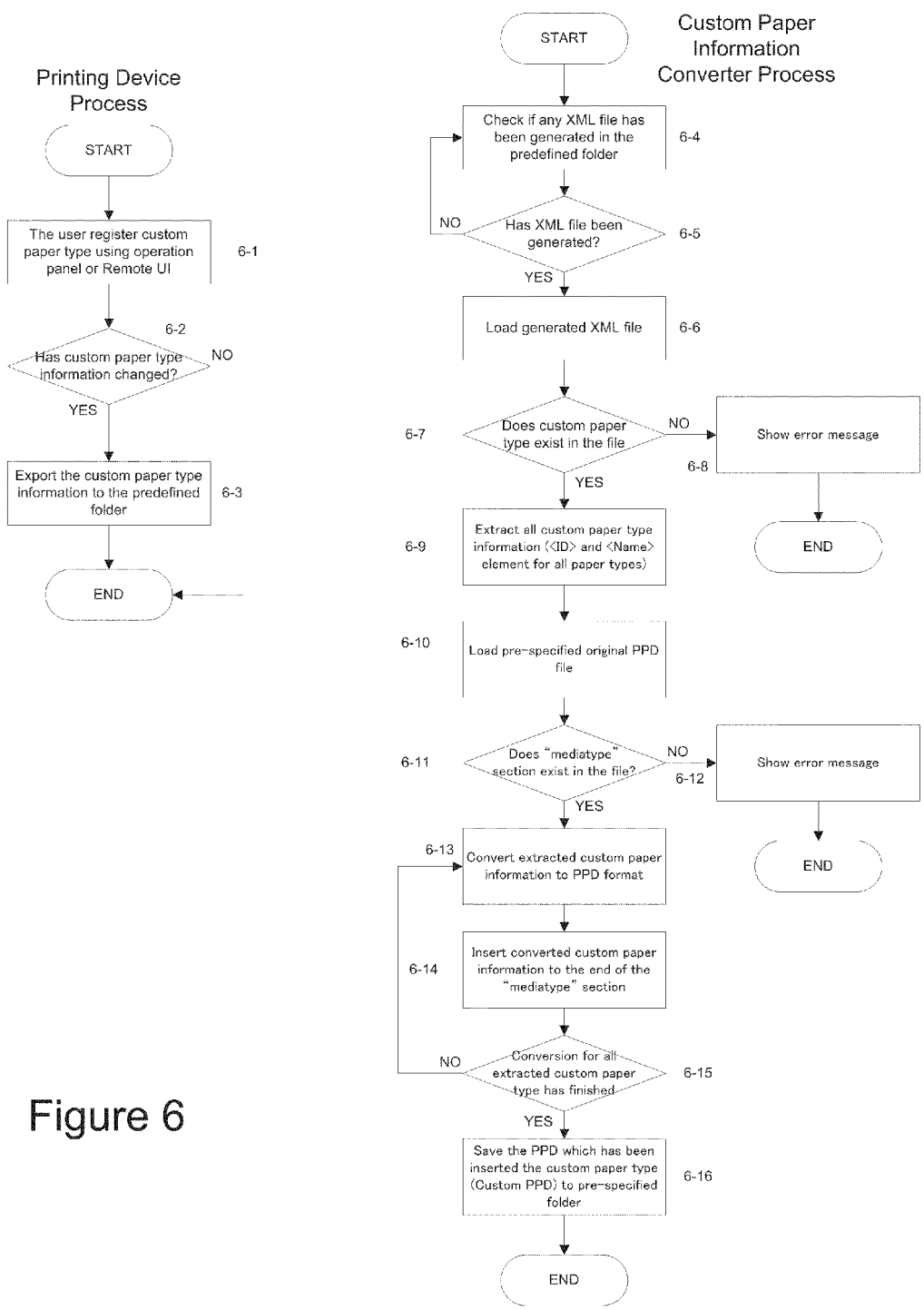
FIG. 6 is a flowchart for generating a custom PPD file according to another exemplary embodiment.

FIG. 6 is a flowchart for generating a custom PPD file according to another exemplary embodiment. In the present embodiment, steps 6-1 through 6-3 are performed in the printing device (multi-function device 1-1), while steps 6-4 through 6-16 are performed in host computer 1-2.

Turning to FIG. 6, in step 6-1, a custom paper type is registered with a printing device (multi-function device 1-1) either via a Remote UI or via an operational panel of the printing device. Then, in step 6-2, a determination is made whether the custom paper type information has changed from what was previously stored on the printing device. A change in custom paper type information includes, but is not limited to, a change in the existing custom paper type information or the presence of a new custom paper type information.

If it is determined that the custom paper type has changed, then in step 6-3, the custom paper type information is exported and stored. As described above, the exported custom paper type information is in an XML file format, but any file format enabling practice of the present invention is applicable. In the present embodiment, the custom paper type file is stored in a predefined folder on host computer 1-2, but any other storage location, e.g., remote data storage server that would enable practice of the present invention is applicable. The process then ends. If is it determined that the custom paper type information did not change, the process ends.

In step 6-4, a check is made whether the predefined folder contains any XML files. If, in step 6-5, it is determined that no XML files exist, flow returns to step 6-4. If it is determined that an XML files does exist, then flow proceeds to step 6-6. In step 6-6, the XML file is loaded. Steps 6-7 through 6-16 are similar to steps 5-2 through 5-11 of FIG. 5, and thus, a detailed description herein is omitted.

The above-described embodiments describe processes where the custom paper type information is initially exported from the printing device (multi=function device 1-1). In yet another embodiment, a periodic check of the paper type information in the printing device (multi-function device 1-1) is made. When a change is detected, the custom paper information converter process is implemented.

Figure 7:
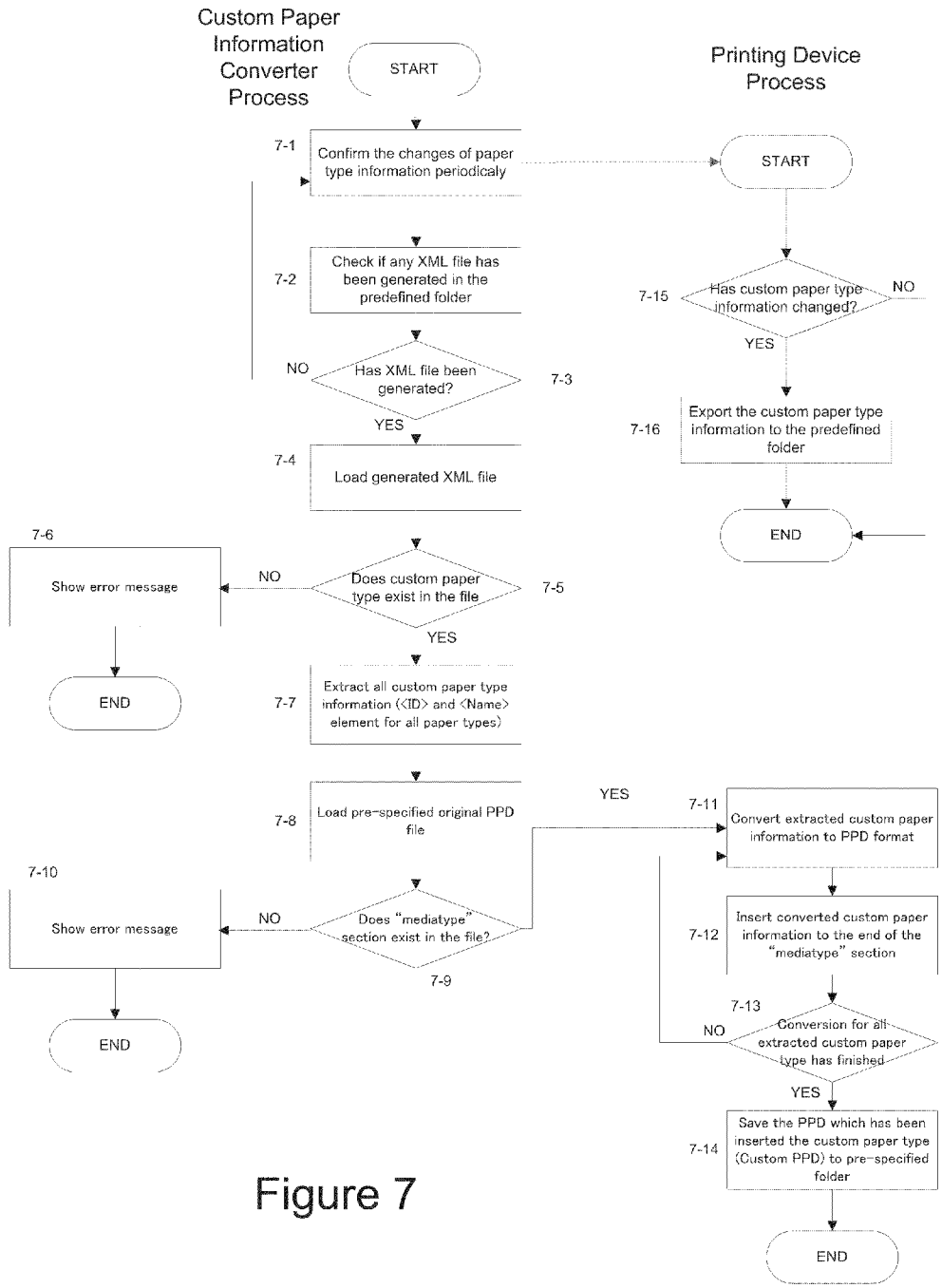
FIG. 7 is a flowchart for generating a custom PPD file according to another exemplary embodiment.

FIG. 7 is a flowchart for generating a custom PPD file according to the present embodiment. In the present embodiment, steps 7-1 through 7-14 are performed in the host computer 1-2, where steps 7-2 through 7-14 are similar to steps 6-4 through 6-16 of FIG. 6 and steps 7-15 and 7-16 are performed by the printing device (multi-function device 1-1) and are similar to steps 6-2 and 6-2 of FIG. 6. Thus, only a description of step 7-1 will be provided. In step 7-1, a periodic check is performed to determine whether any changes in the paper type information stored in the printing device (multi-function device 1-1).

The above-described embodiments have all discussed generating an XML formatted file to create the custom PPD. In still yet another embodiment, custom PPDs can be generated without generating an XML file. More specifically, the custom paper type information is obtained directly from the printing device (multi-function device 1-1) using a communication protocol, e.g., SNMP, etc.

Figure 8:
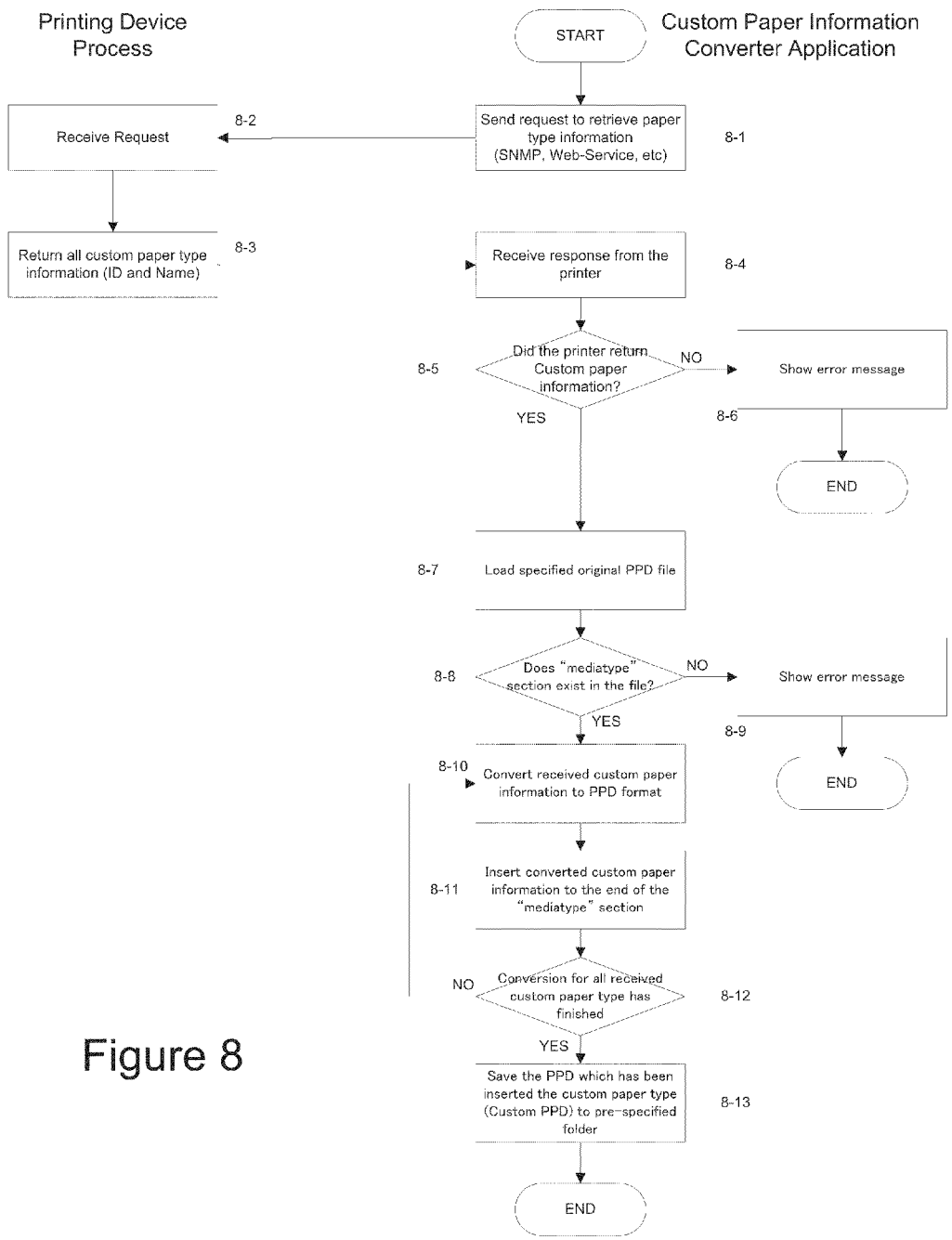
FIG. 8 is a flowchart for generating a custom PPD file according to an exemplary embodiment.

FIG. 8 is a flowchart for generating a custom PPD file according to the present embodiment. In step 8-1, a request is sent to the printing device (multi-function device 1-1) to retrieve paper type information, wherein the request is sent using a communication protocol such as SNMP, etc. Any communication protocol enabling practice of the present invention is applicable. The request is received by the printing device (multi-function device 1-1) in step 8-2, and in step 8-3, the requested custom paper type information is provided.

In step 8-4, the provided custom paper type information is received. Next, in step 8-5, a determination is made whether the printing device returned custom paper type information. If no custom paper type information was returned, then flow proceeds to step 8-6, where an error message is displayed and then the process terminates.

If it is determined that custom paper type information was returned, then flow proceeds to step 8-7. Steps 8-7 through 8-13 are similar to steps 5-5 through 5-11 in FIG. 5, and thus, a detailed description of these steps is omitted herein.

It is to be understood that the above described features can be achieved by a method in which a storage medium is supplied to a system or device, the storage medium having computer-executable process steps for realizing the above described functions, and a computer (CPU or MPU) for the system or device that reads the computer-executable process steps stored in the storage medium and executes them.

In this case, the computer-executable process steps read from the storage medium executes the functions of the above described embodiments. Thus, the computer-executable process steps or the storage medium storing the computer-executable process steps therein constitute the present invention.

As a storage medium for supplying the computer-executable process steps, for example, a floppy disk, a hard disk, an optical disk, a magneto-optical disk, a CD-ROM, a CD-R, a magnetic tape, a non-volatile memory card, a ROM, any other applicable computer-readable storage medium can be employed.

When the computer-executable process steps read by the computer are executed, not only are the above described functions of the embodiments realized, but also an operating system working on the computer may carry out part or all of the actual processing that realizes the functions of the above described embodiments.

The computer-executable process steps read from the computer-readable storage medium may be written to a memory provided on a function-extension board inserted into the computer, of a function-extension unit connected to the computer, and a CPU provided on the function-extension board or unit carries out part of all of the actual processing that realizes the functions of the above described embodiments.

While the invention is described above with respect to what is currently its exemplary embodiment, it is to be understood that the invention is not limited to that described above. To the contrary, the invention is intended to cover various modifications and equivalent arrangements within the spirit and scope of the appended claims.

What is claimed is:

1. A method for generating custom postscript printer description files, the method comprising:
    Creating, in a printing apparatus, a file including previously unregistered custom paper type specific to a user for storage in a printing apparatus, the file being exportable from the printing apparatus and in a file format other than a postscript printer description format;
    obtaining, by a device other than the printing apparatus, the exportable file including paper type information associated with the custom paper type created in the printing apparatus, the file being obtained from the printing apparatus in which the custom paper type has been created;
    obtaining, from a memory of the device other than the printing apparatus, an original postscript printer description file, the original postscript printer description file enabling the device other than the printing apparatus to execute a print job on the printing apparatus;
    converting the paper type information associated with the custom paper type created in the printing apparatus included in the file, into a postscript printer description format;
    modifying the original postscript printer description file by inserting, into a media type section of the original postscript printer description file, the converted paper type information associated with the custom paper type created in the printing apparatus to create a custom postscript printer description file; and
    storing the custom postscript printer description file to enable the device other than the printing apparatus to execute a print job specifying the custom paper type.

2. The method according to claim 1, wherein the first file format is in an extensible markup language file format.

3. The method according to claim 1, wherein the first file format is in a communication protocol file format.

4. The method according to claim 1, wherein obtaining the file including paper type information associated with the custom paper type created in the printing apparatus includes periodically checking a predetermined storage location for a change in the file including paper type information, and wherein when a change is detected, obtaining the file including paper type information from the predetermined storage location.

5. The method according to claim 4, wherein a change in paper type information includes a change in an existing paper type information or a presence of new paper type information.

6. A system for generating custom postscript printer description files, the system comprising:
    at least a first device, wherein paper type information that includes previously unregistered custom paper types that have been created in the at least first device is stored; and
    at least a second device,
    wherein the first device includes a processor coupled to a memory, wherein the processor is programmed to:
        export the paper type information as a file having a first file format other than a postscript printer description format, and
    wherein the second device includes a processor coupled to a memory, wherein the processor is programmed to:
        obtain, from the first device, the file including the paper type information associated with the custom paper types created in the at least first device,
        obtain, from the memory of the second device, an original postscript printer description file, the original postscript printer description file enabling the second device to execute a print job on the first device,
        convert the paper type information associated with the custom paper types created in the at least first device into a postscript printer description format,
        modify the original postscript printer description file by inserting, into a media type section of the original postscript printer description file, the converted paper type information associated with the custom paper types created in the at least first device to create a custom postscript printer description file, and
        store the custom postscript printer description file.

7. The system according to claim 6, wherein the paper type information exported as a file from the at least first device is stored in the at least second device.

8. The system according to claim 6, wherein the paper type information exported as a file from the at least first device is stored at a location remote from the at least second device, and wherein the at least second device obtains the paper type information from the location remote from the at least second device.

9. The system according to claim 6, wherein the first file format is exported in an extensible markup language file format.

10. The system according to claim 6, wherein the first file format is exported in a communication protocol file format.

11. The system according to claim 6, wherein the paper type information associated with the custom paper types created in the at least first device is extracted from the file.

12. The system according to claim 6, wherein the paper type information is created on the at least first device either at the at least first device or at a location remote from the at least first device.

13. The system according to claim 6, wherein, the at least first device exports the paper type information as a file in the first file format other than postscript printer description format to a predetermined storage location when the at least first device detects that new paper type information was created in the at least first device, and
    the at least second device detects the new paper type information in the predetermined storage location and obtains the new paper type information from the predetermined storage location.

14. The system according to claim 6, wherein, the at least second device conducts a periodic check to determine whether the paper type information created in the at least first device has changed, wherein the check causes the at least first device to check whether the paper type information created in the at least first device has changed and to export the paper type information as a file to a predetermined storage location when the at least first device determines the paper type information has changed.

15. The system according to claim 14, wherein a change in paper type information includes a change in existing paper type information or a presence of new paper type information.

16. An apparatus for generating custom postscript printer description files, the apparatus comprising:

a processor coupled to a memory
wherein the processor is programmed to:
  obtain, from a printing apparatus, a file created on the printing apparatus, the file including paper type information representing previously unregistered custom paper type specific to a user and being exportable from the printing apparatus in a data format other than a postscript printer description format,
  obtain, from the memory of the apparatus, an original postscript printer description file, the original postscript printer description file enabling the apparatus to execute a print job on the printing apparatus,
  convert the paper type information associated with the custom paper type created in the printing apparatus into a postscript printer description file format,
  modify the original postscript printer description file by inserting, into a media type section of the original postscript printer description file, the converted paper type information associated with the custom paper type created in the printing apparatus to create a custom postscript printer description file, and
  store the custom postscript printer description file.

17. A non-transitory computer-readable storage medium storing computer-executable process steps, the computer-executable process steps causing a computer to execute a method, the method comprising:
  creating, in a printing apparatus, a file including previously unregistered custom paper type specific to a user for storage in a printing apparatus, the file being exportable from the printing apparatus and in a file format other than a postscript printer description format;
  obtaining, by a device other than the printing apparatus, the a exportable file including paper type information associated with the custom paper type created in the printing apparatus, the file being obtained from the printing apparatus in which the custom paper type has been created;
  obtaining, from a memory of the device other than the printing apparatus, an original postscript printer description file, the original postscript printer description file enabling the device other than the printing apparatus to execute a print job on the printing apparatus;
  converting the paper type information associated with the custom paper type created in the printing apparatus included in the file, into a postscript printer description format;
  modifying the original postscript printer description file by inserting, into a media type section of the original postscript printer description file, the converted paper type information associated with the custom paper type created in the printing apparatus to create a custom postscript printer description file; and
  storing the custom postscript printer description file.

18. A method for generating custom postscript printer description files, the method performed by a first computing device and comprising:
  obtaining, from a printing apparatus, a custom paper type file created in the printing apparatus, the custom paper type file including paper type information associated with previously unregistered custom paper type created in the printing apparatus, the custom paper type file being in format other than a postscript printer description format;
  obtaining, from a memory of the first computing device, an original postscript printer description file, the original post script printer description file enabling the first computing device to execute a print job on the printing apparatus;
  converting the paper type information associated with the custom paper type created in the printing apparatus included in the file, into a postscript printer description format;
  modifying the original postscript printer description file by inserting, into a media type section of the original postscript printer description file, the converted paper type information associated with the custom paper type created in the printing apparatus to create a custom postscript printer description file; and
  storing the custom postscript printer description file.

* * * * *